(12) United States Patent
MacBain et al.

(10) Patent No.: US 7,204,082 B1
(45) Date of Patent: Apr. 17, 2007

(54) SYSTEM FOR COMBUSTION OF REFORMATE IN AN ENGINE EXHAUST STREAM

(75) Inventors: John Alan MacBain, Carmel, IN (US); Joseph V. Bonadies, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/298,886

(22) Filed: Dec. 9, 2005

(51) Int. Cl.
*F01N 3/00* (2006.01)

(52) U.S. Cl. .............................. 60/286; 60/274; 60/276; 60/287; 60/289; 60/295; 60/297

(58) Field of Classification Search ................ 60/274, 60/275, 276, 286, 287, 288, 289, 295, 297, 60/303; 422/169, 170, 172, 182, 183
See application file for complete search history.

(56) References Cited

U.S. PATENT DOCUMENTS

| | | | |
|---|---|---|---|
| 3,757,521 A * | 9/1973 | Tourtellotte et al. .......... 60/274 |
| 5,584,178 A * | 12/1996 | Naegeli et al. ................ 60/303 |
| 5,974,791 A * | 11/1999 | Hirota et al. .................. 60/276 |
| 6,745,560 B2 * | 6/2004 | Stroia et al. ................... 60/286 |
| 6,843,054 B2 * | 1/2005 | Taylor et al. .................. 60/275 |
| 6,892,529 B2 * | 5/2005 | Duvinage et al. ............. 60/286 |
| 2002/0011069 A1 * | 1/2002 | Maus et al. .................... 60/285 |
| 2006/0010859 A1 * | 1/2006 | Yan et al. ...................... 60/286 |
| 2006/0021331 A1 * | 2/2006 | Cizeron et al. ................ 60/286 |

* cited by examiner

*Primary Examiner*—Tu M. Nguyen
(74) *Attorney, Agent, or Firm*—Paul L. Marshall

(57) ABSTRACT

In a diesel engine equipped with a catalytic HC reformer for injecting reformate into the engine exhaust stream to reductively regenerate one or more emissions control devices including but not limited to a lean nitrogen trap, a combustor is disposed in the exhaust stream downstream of the LNT, and preferably downstream of all regenerable emissions control devices, to burn any residual HC, $H_2$, or CO in the tailpipe exhaust gases. Thus only breakthrough amounts of these species are combusted. Preferably, the combustor is operated on an appropriate schedule governed by the operating schedule of the reformer. To assure combustion when the oxygen concentration of the exhaust falls below the reformate combustion limit of approximately 6%, make-up air is ported to the combustor either by diverting a portion of the reformer system air or by diverting excess turbocharger boost air from the engine air intake system.

15 Claims, 4 Drawing Sheets

SYSTEM FOR COMBUSTION OF REFORMATE IN AN ENGINE EXHAUST STREAM

TECHNICAL FIELD

The present invention relates to the mitigation of the levels of pollutants in the exhaust stream of an internal combustion engine; more particularly, to method and apparatus for reducing the levels of carbon monoxide and hydrocarbons in the exhaust stream of a diesel engine wherein hydrocarbon reformate from a catalytic hydrocarbon reformer is injected into the exhaust stream to regenerate emissions control devices such as a lean nitrogen oxides trap (LNT); and most particularly, to such an exhaust arrangement wherein a burner for combusting residual reformate is disposed downstream of the LNT.

BACKGROUND OF THE INVENTION

It is known in the automotive arts to couple a catalytic hydrocarbon reformer to the exhaust system of an internal combustion engine, and especially a diesel or other compression-ignited engine, in order to regenerate one or more pollution control devices in the exhaust stream. Such engines are provided typically with a diesel particulate filter (DPF) for collecting soot particles; and also with an LNT for adsorbing oxides of nitrogen generated during certain engine operating modes. Known LNTs are highly efficient at removing nitrogen oxides from an exhaust stream but typically have rather low capacity, requiring regeneration at short intervals of engine operation, for example, once per minute. Reformate, containing high levels of reducing agents, principally molecular hydrogen ($H_2$) and CO, is known to be effective in reducing nitrogen oxides to molecular nitrogen, which can then be swept out of the LNT by the passage of further exhaust gas. Typically, reformate is produced by a warmed-up reformer on a periodic schedule driven by the periodic need for LNT regeneration, which schedule may be intermittent, continuous, or only during certain modes of engine operation.

An operational problem arises during start-up mode of the engine and reformer. A diesel hydrocarbon reformer has a warm-up period wherein reforming is performed continuously. During this time, effluent from the reformer is only partially reformed and contains significant amounts of non-reformed hydrocarbons (HC) as well as $H_2$ and CO. Further, not all of the $H_2$ and CO being produced is consumed by the LNT, resulting in unacceptable levels of HC, $H_2$, and CO being emitted in the engine exhaust stream during start-up. A known approach to solving this problem is to combust the residual HC, $H_2$, and CO in the exhaust stream ahead of the LNT during start-up.

Another operational problem arises during normal pulsed operation of the reformer wherein a pulse is too long and thus produces more $H_2$ and CO than is required for LNT regeneration, resulting in HC and/or CO "breakthrough" of the LNT. This problem cannot be resolved by combusting excess reformate ahead of the LNT unless there is an effective means to sense when breakthrough occurs. It is known to determine when regeneration is complete by mounting a lambda sensor downstream of the LNT to sense breakthrough of HC and/or CO. This approach is unsatisfactory because a) it requires some level of breakthrough in order to function; b) it negates any further regeneration of the LNT even if only one portion of the trap has suffered breakthrough; and c) even after breakthrough is sensed and reforming is terminated, all the residual HC and CO within the exhaust system downstream of a combustor must be expelled in the exhaust stream to atmosphere.

What is needed in the art is a means for preventing breakthrough HC and CO from reaching atmosphere.

It is a principal object of the present invention to improve the quality of engine exhaust emissions by reducing the tailpipe levels of HC, $H_2$, and CO originating in an associated HC reformer while also reducing levels of the same species originating in the internal combustion engine.

SUMMARY OF THE INVENTION

Briefly described, in a diesel or other engine equipped with a catalytic HC reformer for injecting reformate into the engine exhaust stream to reductively regenerate one or more emissions control devices including but not limited to an LNT, a combustor is disposed in the exhaust stream downstream of the LNT, and preferably downstream of all regenerable emissions control devices, whether shown exemplarily herein or not, to burn any residual HC, $H_2$, or CO in the tailpipe exhaust gases. Thus only breakthrough amounts of these species are combusted.

Preferably, the combustor is operated on an appropriate schedule governed by the operating schedule of the reformer. To assure adequate combustion, when the oxygen concentration of the exhaust falls below the reformate combustion limit of approximately 6%, make-up air is ported to the combustor either by diverting a portion of the reformer system air or by diverting excess turbocharger boost air from the engine air intake system.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

The benefits and advantages of a system in accordance with the invention may be better appreciated by first considering a prior art emissions control system.

Figure 1:
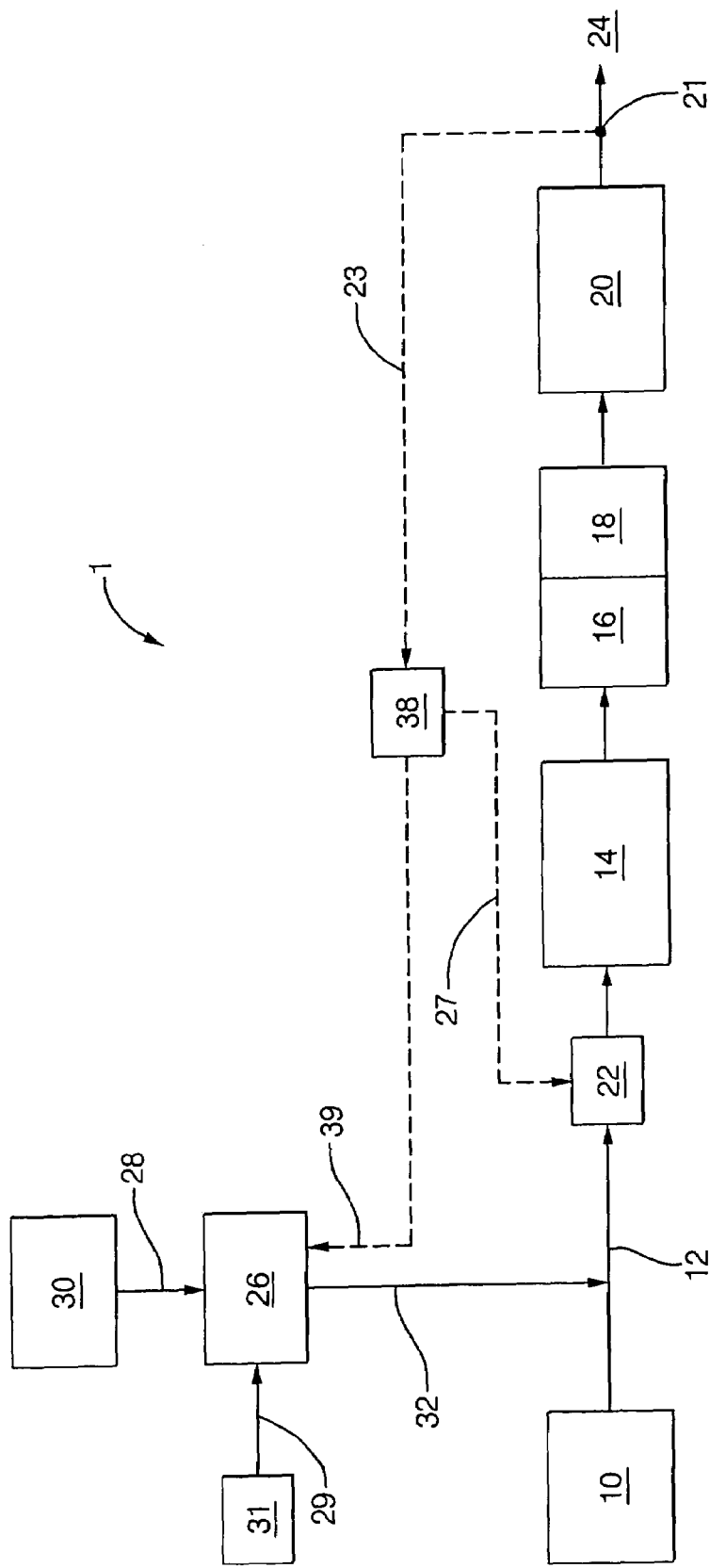
FIG. 1 is a prior art LNT and reformate control system for an engine exhaust stream.

Referring to FIG. 1, in an embodiment 1 of a prior art reformate emission control system, an engine 10 emits an exhaust stream 12 which may contain carbon particles, carbon monoxide, and/or oxides of nitrogen. Exhaust stream 12 is passed sequentially through a plurality of emission control devices, including but not limited to a particulate filter 14 such as a diesel particulate filter (DPF); a small LNT 16 that can warm up rapidly and hence provide virtually immediate control of NOx; an oxidation catalyst 18; and a main LNT 20 having capacity for steady—steady state operation, the exhaust from which is discharged to atmosphere 24.

A reformate source 26, such as for example, a hydrocarbon reformer, catalytically combines air 28 from an air source 30 with hydrocarbon fuel 29 from a fuel source 31 to yield a stream of reformate 32 that is entered into exhaust stream 12 ahead of the string of emission control devices. An electronic controller 38 controls 39 reformer 26. A combustor 22, for example a spark-ignited device, is disposed in exhaust stream 12 ahead of emissions mitigation devices 14, 16, 18,20 and is also controlled by controller 38. A lambda sensor 21 is located in exhaust stream 12 downstream of LNT 20 to sense when breakthrough occurs and sends a signal 23 to controller 38 which then deactivates reformate source 26 and energizes 27 combustor 22 to burn all reformate upstream of the combustor.

As noted above, this approach is unsatisfactory because it requires some level of breakthrough in order to function; it negates any further regeneration of DPF 14 or LNT 20 even if only one portion of either device has suffered breakthrough; and all the residual reformate within the exhaust system downstream of combustor 22 must be expelled in the exhaust stream to atmosphere.

Another disadvantage is that combustor 22 must rely for combustion oxidant solely on oxygen in the exhaust stream. When the oxygen percentage falls below about 6%, combustion is incomplete or may not occur at all.

Figure 2:
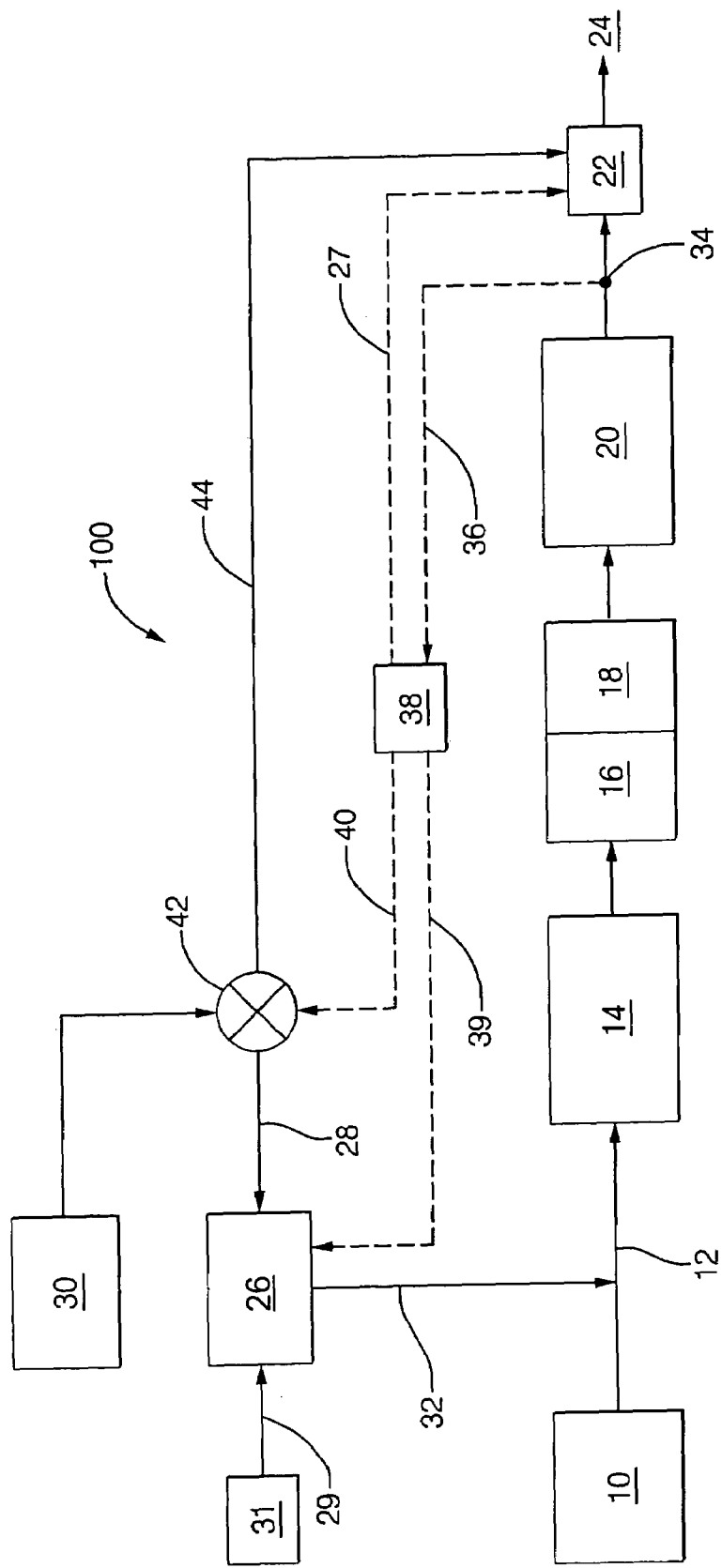
FIG. 2 is a first embodiment of an improved reformate control system for an engine exhaust stream.

Referring to FIG. 2, in a first embodiment 100 of an improved reformate emission control system in accordance with the invention, the general arrangement is similar to prior art arrangement 1 except that combustor 22 is located downstream of the exhaust emission control devices.

Engine 10, which may be either spark-ignited or compression-ignited, emits an exhaust stream 12 which may contain atmosphere pollutants such as carbon particles, carbon monoxide, and/or oxides of nitrogen. Exhaust stream 12 is passed sequentially through a plurality of emission control devices, including but not limited to a particulate filter 14 such as a prior art diesel particulate filter (DPF); a small prior art LNT 16 that can warm up rapidly and hence provide virtually immediate control of NOx; an oxidation catalyst 18; a prior art main LNT 20 having capacity for steady-state use; and a combustor 22, the exhaust from which to atmosphere 24 is free of residual HC, $H_2$, and CO.

A reformate source 26 catalytically combines air 28 from an air source 30 with hydrocarbon fuel 29 from a fuel source 31 to yield a stream of reformate 32 that is entered into exhaust stream 12 ahead of the string of emission control devices. Air source 30 may be, for examples, a separate air pump or turbo charged boost air from the air intake system of engine 10. An oxygen sensor 34 ahead of combustor 22 sends a signal 36 to controller 38 indicative of the percentage of oxygen in the exhaust at that point. Controller 38 controls 40 the action of a diverter valve 42 in the air flow to reformate source 26. When the sensed oxygen level falls below a predetermined percentage, for example, 6%, valve 42 diverts a combustion-enhancing air flow 44 into combustor 22 to assure complete combustion of reformate residuals in the exhaust stream. Controller 38 energizes 27 combustor 22 as necessary to burn all residual reformate in the exhaust system after reformate source 26 is deactivated, thus preventing emission of HC, CO, or $H_2$ to atmosphere 24.

Figure 3:
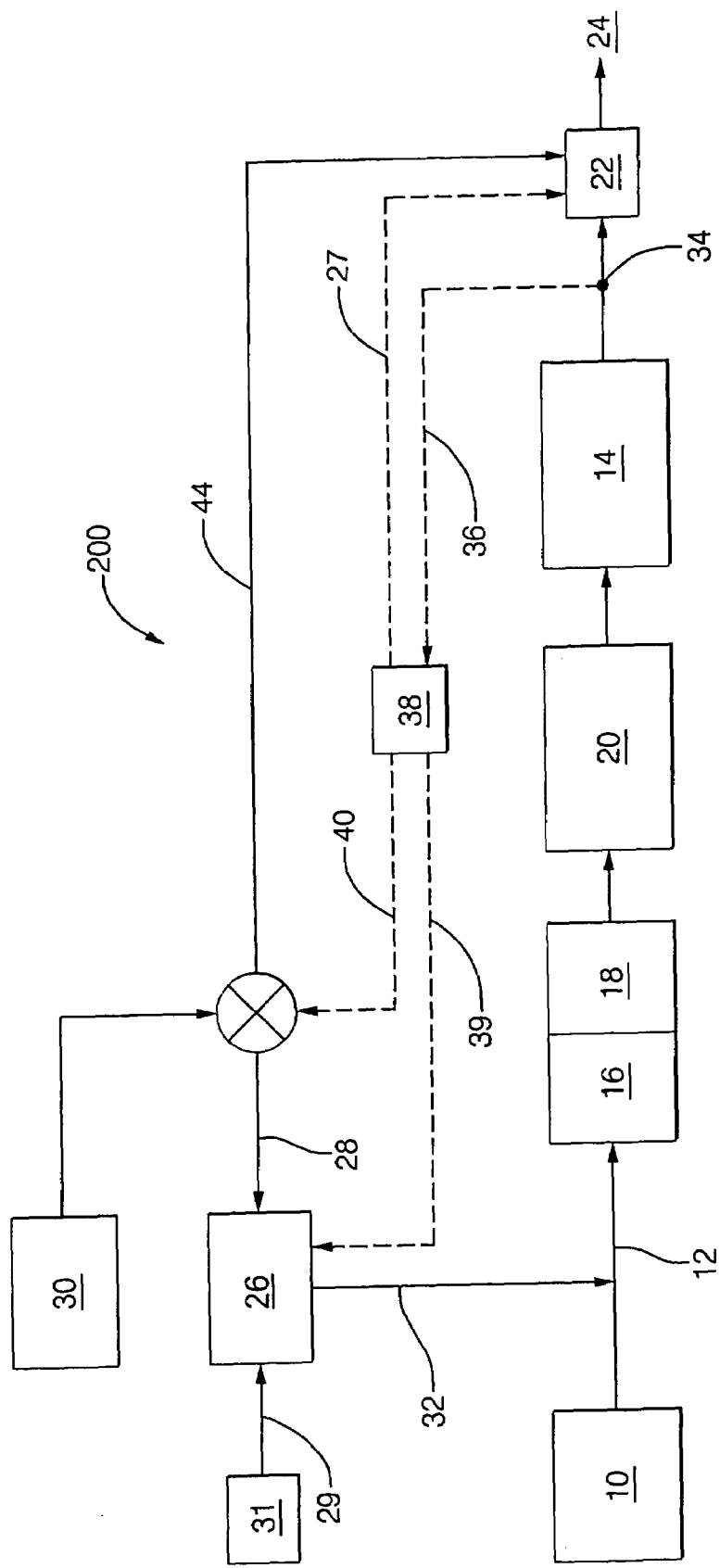
FIG. 3 is a second embodiment of an improved reformate control system for an engine exhaust stream.

Referring to FIG. 3, in a second embodiment 200 in accordance with the invention, the reformate control arrangement and control scheme is identical with that shown for embodiment 100. The only difference here is that DPF 14 is located in exhaust stream 12 after rather than before LNT 20, which may be desirable in some automotive applications.

Figure 4:
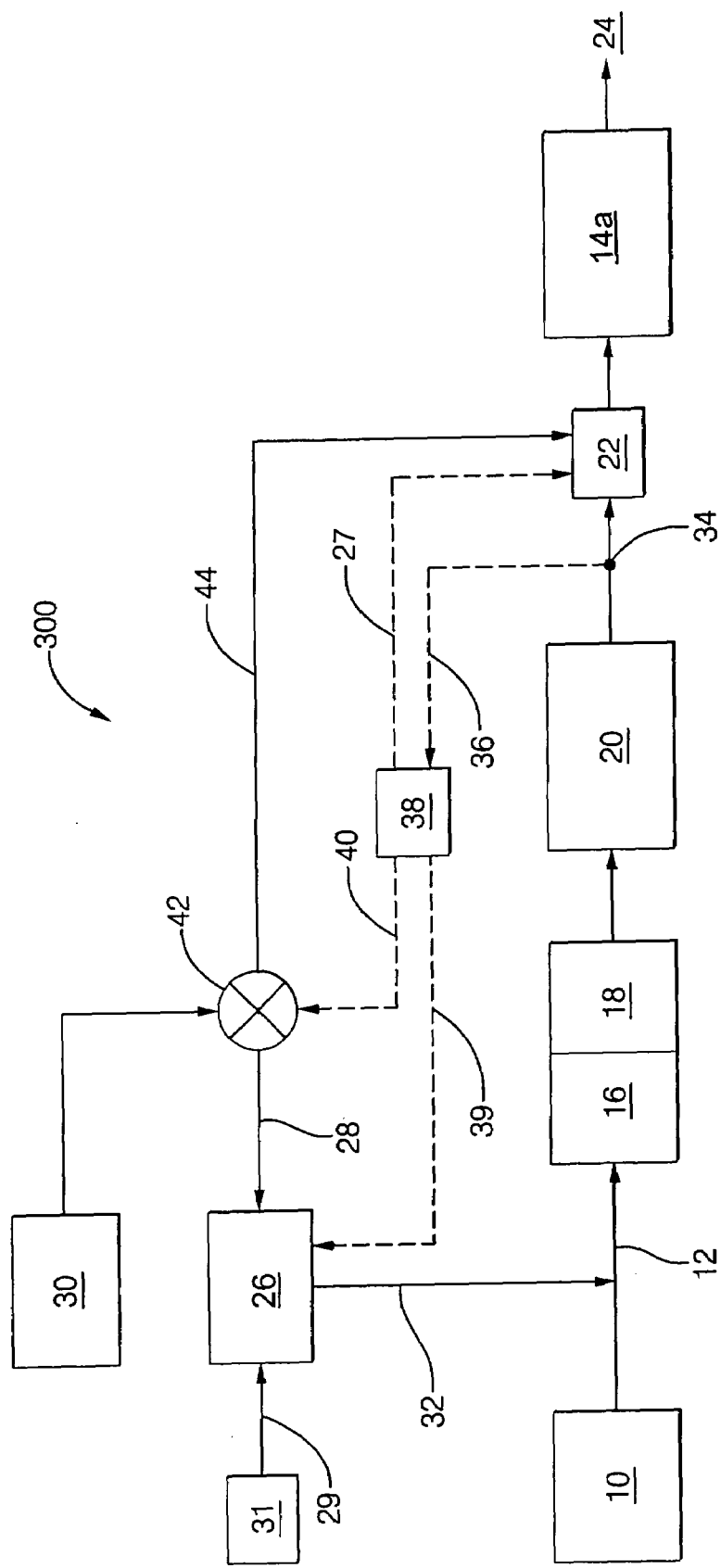
FIG. 4 is a third embodiment of an improved reformate control system for an engine exhaust stream.

Referring to FIG. 4, in a third embodiment 300 in accordance with the invention, the reformate control arrangement and control scheme is the same as shown for embodiment 200 in FIG. 3 except that the diesel particulate filter 14a is disposed downstream of burner 22 and includes a catalyst for removing small quantities of $H_2$, CO, and HC as may pass through the exhaust system during engine transients or LNT regenerations. In this embodiment, valve 42 diverts a combustion-enhancing air flow 44 into combustor 22 when oxygen sensor 34 detects reductant breakthrough. Once the particulate filter 14a has been heated to a temperature above the HC and CO light-off temperature of about 200 C, ignition within combustor 22 may be deactivated, as the hot surfaces of particulate filter 14a will promote combustion. Reforming in embodiments 100,200,300 may be either pulsed or continuous. During either reforming schedule, post-treatment combustion in accordance with the invention is just as effective as prior art pre-treatment combustion (FIG. 1) at preventing breakthrough. Further, no HC, $H_2$, or CO is combusted prior to any emissions control device having the opportunity to use them; thus more effective filter regeneration is achieved.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for reducing emission levels in an exhaust stream of a diesel engine, the exhaust stream receiving reformate from a reformate source, the method comprising the steps of:
   a) positioning a combustor in the exhaust stream;
   b) disposing a catalytic particulate filter in the exhaust stream downstream of the combustor;
   c) providing air to the reformate source from an air source;
   d) providing a diverter valve upstream of the reformate source;
   e) diverting the air from the air source to the combustor using the diverter valve; and
   f) igniting the combustor to burn reformate residuals present in the exhaust stream.

2. The method for reducing emission levels in accordance with claim 1, further comprising the steps of:
   sensing a temperature of the particulate filter; and
   deactivating ignition in the combustor when the temperature of the particulate filter is above the temperature for light off of the residuals.

3. A method for reducing emission levels in an exhaust stream of a diesel engine, the exhaust stream receiving reformate from a reformate source, the method comprising the steps of:
   a) disposing a nitrogen oxides trap in the exhaust stream;
   b) positioning a combustor in the exhaust stream downstream of the nitrogen oxides trap;
   c) sensing an oxygen content of the exhaust stream upstream of the combustor;
   d) supplying an air stream in parallel flow to the exhaust stream to the combustor;

e) providing a diverter valve for controlling the air stream to the combustor;
f) providing a signal to the diverter valve to allow the air stream to flow to the combustor when the oxygen content is sensed to be below a predetermined concentration; and
g) igniting the combustor to burn reformate residuals present in the exhaust stream.

4. The method for reducing emission levels in accordance with claim 3, wherein the diverter valve allows the air stream to flow to the combustor when the sensed oxygen content is less than 6%.

5. An internal combustion engine comprising a system for control of unconsumed reformate injected into an engine exhaust stream for regeneration of one or more regenerable emissions control devices, wherein one of such devices is a nitrogen oxides trap, said system including:
   a combustor disposed in said engine exhaust stream downstream of said nitrogen oxides trap for burning reformate not consumed in regeneration of said regenerable devices;
   a reformate source;
   an air source for said reformate source; and
   a diverter valve upstream of said reformate source for diverting air from said air source to said combustor.

6. A system for control of unconsumed reformate injected into an engine exhaust stream for regeneration of one or more regenerable emissions control devices, wherein one of such devices is a nitrogen oxides trap, comprising:
   a combustor disposed in said engine exhaust stream downstream of said nitrogen oxides trap for burning reformate not consumed in regeneration of said regenerable devices;
   a reformate source;
   an air source for said reformate source; and
   a diverter valve upstream of said reformate source for diverting air from said air source to said combustor.

7. A system in accordance with claim 1 wherein said one or more emissions control devices further includes a particulate filter.

8. A system in accordance with claim 1 wherein a catalytic particulate filter is disposed in said engine exhaust stream downstream of said combustor.

9. A system in accordance with claim 1 wherein said diverted air bypasses said reformate source to provide make-up air to said combustor.

10. A system in accordance with claim 1 wherein both said engine exhaust stream and said diverted air flows into said combustor.

11. A system in accordance with claim 1 further comprising an oxygen sensor disposed in said engine exhaust stream.

12. A system in accordance with claim 11 further comprising an electronic controller operationally connected to said combustor, said reformate source, said diverter valve, and said sensor for coordinating the respective actions thereof.

13. A system for control of unconsumed reformate injected into an engine exhaust stream for regeneration of at least one regenerable emissions control device, wherein said at least one regenerable emissions control device includes a nitrogen oxides trap and a particulate filter, comprising a combustor disposed in said engine exhaust stream downstream of said nitrogen oxides trap and said particulate filter for burning reformate not consumed in regeneration of said regenerable devices, the system further comprising:
   a) a reformate source;
   b) an air source for said reformate source; and
   c) a diverter valve upstream of said reformate source for diverting air from said air source to said combustor.

14. A system in accordance with claim 13 further comprising an oxygen sensor disposed in said engine exhaust stream.

15. A system in accordance with claim 14 further comprising an electronic controller operationally connected to said combustor, said reformate source, said diverter valve, and said sensor for coordinating the respective actions thereof.

* * * * *